United States Patent [19]
Dening

[11] 3,864,560
[45] Feb. 4, 1975

[54] DEVIATION VALUE GENERATOR

[75] Inventor: Daniel R. Dening, Quincy, Ill.

[73] Assignee: Harris-Intertype Corporation, Cleveland, Ohio

[22] Filed: Dec. 11, 1972

[21] Appl. No.: 314,264

[52] U.S. Cl.... 235/151.13, 235/92 QC, 235/92 MT, 235/177
[51] Int. Cl. ............................................. G06f 7/50
[58] Field of Search ...... 235/151.13, 92 PE, 92 BD, 235/92 BN, 92 QC, 92 MT, 92 MS, 151.1, 132 A, 132 E, 151.34, 176, 177, 150.53; 324/78 Z

[56] References Cited
UNITED STATES PATENTS

| | | | |
|---|---|---|---|
| 3,584,203 | 6/1971 | Patzelt et al. | 235/151.1 |
| 3,604,905 | 9/1971 | Riondel | 235/150.53 |
| 3,617,716 | 11/1971 | Schulz | 235/151.13 |
| 3,659,091 | 4/1972 | Holzem et al. | 235/177 |
| 3,700,865 | 10/1972 | Ley | 235/151.34 |

Primary Examiner—Malcolm A. Morrison
Assistant Examiner—Errol A. Krass

[57] ABSTRACT

A deviation value generator indicates the deviation of an actual number of events which have occurred during an increasing time interval, from a predetermined desired number of such events. The generator output consists of digital representations of the deviation including a representation of the sense of the deviation, i.e., whether the trend of the deviations is toward or away from the predetermined number.

7 Claims, 2 Drawing Figures

DEVIATION VALUE GENERATOR

BACKGROUND

1. Field of the Invention

The invention is directed to counter circuits, and specifically to a pulse counting circuit which provides an output count representative of the deviation of the number of pulses counted from a preselected total.

2. Prior Art:

It is customary to provide circuits which operate to count the total number of events occurring within a selected time period. The total count is thereupon displayed or otherwise utilized to produce a desired result.

When counting the events occurring toward a preselected goal, however, the desired information is frequently the deviation of the instantaneous count from the preselected total. If a conventional counter is used for such purpose, the operator or observer must mentally manipulate the count relative to the preselected total to derive the deviation.

SUMMARY OF THE INVENTION

The principal object of the present invention is to provide a deviation counter; that is, a counter whose output is representative of the deviation of the instantaneous count of incoming pulses, referenced to a given starting time, from a preselected total number of pulses.

Briefly, the desired objective is achieved by supplying the pulses to a programmable counter means programmed to count the incoming pulses in accordance with a predetermined count. That is, each binary count of the counter is configured according to its relationship to the predetermined count, rather than simply being representative of a constantly increasing absolute count. Means are provided which are responsive to the binary count of the counter means at any given instant and to the relationship of that count to the predetermined count, i.e., whether the deviation is decreasing or increasing, to convert that count to a digital representation of the deviation and the sense of the deviation.

DETAILED DESCRIPTION

Figure 1:
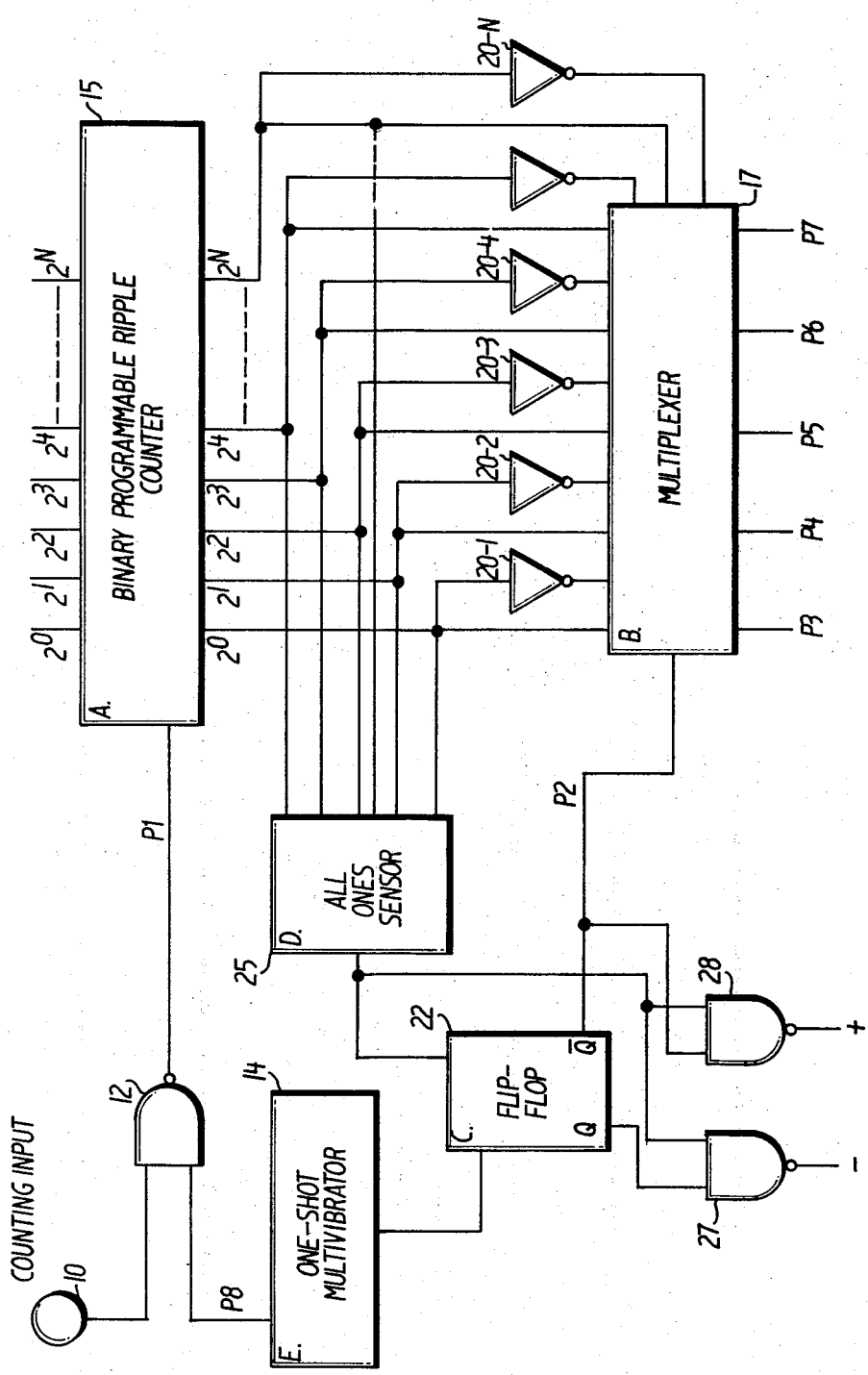
FIG. 1 is a block diagram of a preferred embodiment of the deviation value generator.
Figure 2:
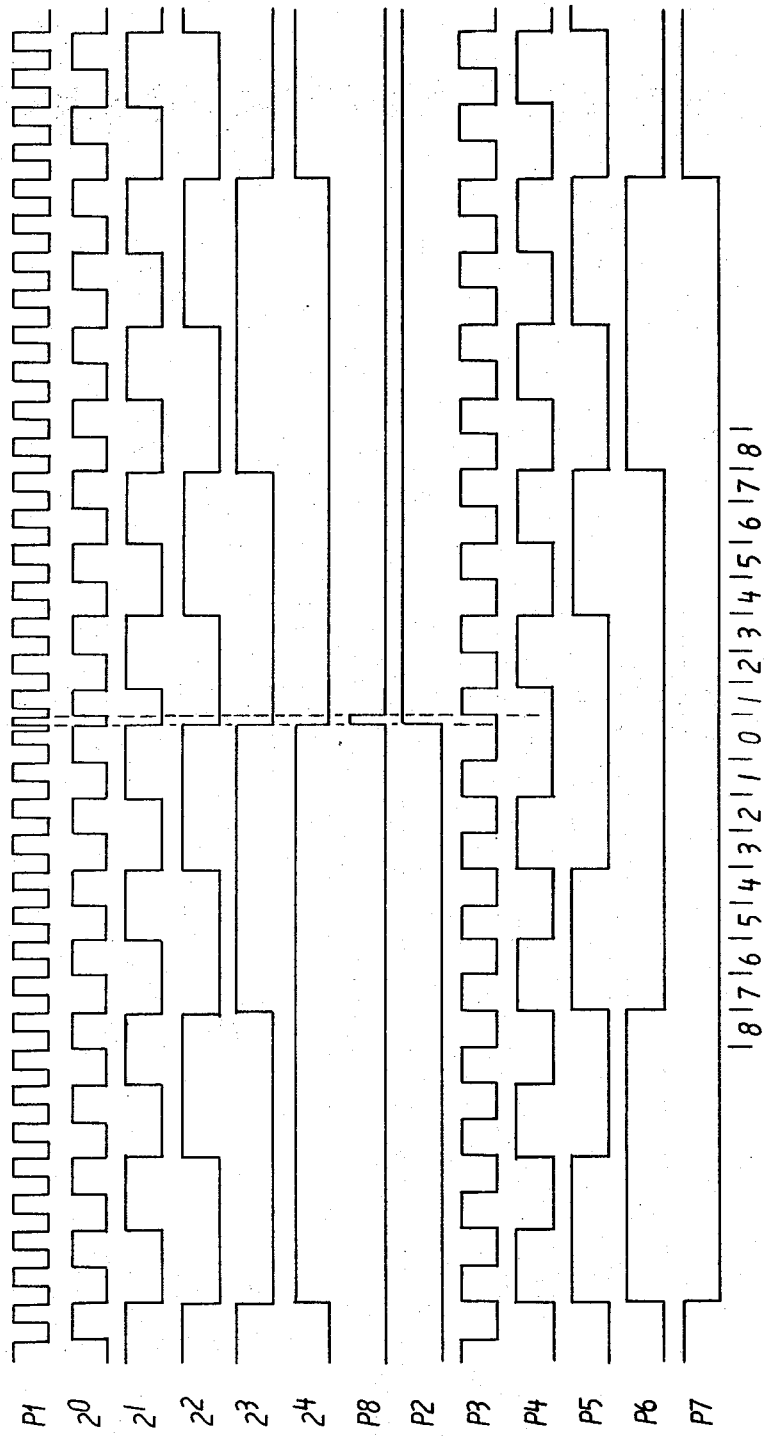
FIG. 2 is a graph of the time relationships at selected points of the circuit of FIG. 1 during the counting process.

The deviation value generator circuit is shown in block diagrammatic form in FIG. 1. Concurrent reference should be made throughout this description to the timing diagram of FIG. 2 for specific points designated in FIG. 1. Count pulses are applied to a counting input terminal 10 constituting one terminal of NAND gate 12. The other input to gate 12 is the output of a one-shot multivibrator 14 whose purpose is to inhibit an undesired state as will be explained presently.

Pulses from the gate 12 are supplied to a binary programmable ripple counter 15. Counter 15 is programmed to reach the "full" (i.e., all 1's) state when the preselected total number of counting pulses (counted events) is inputted to the counter from gate 12. All of the biniary outputs of the counter are connected to the inputs of a multiplexer 17. In addition to the normal counter outputs, inverted counter outputs are supplied as inputs to multiplexer 17 via a set of inverters 20-1, 20-2, . . . , 20-N.

Multiplexer 17 is constrained to select one or the other of the normal and inverted sets of counter outputs as inputs thereto, according to the state of a flip-flop circuit 22. The state of flip-flop 22 is a function of the state of an "all 1's" sensor 25 which, as the name implies, responds to the condition of a full count (all 1's) in counter 15 to generate an output pulse for changing the state of flip-flop 22. In addition, the state of flip-flop 22 controls the condition of the one-shot multivibrator 14. Outputs representative of the two states (designated Q and $\bar{Q}$) of flip-flop 22 are coupled to an input of respective ones of NAND gates 27 and 28, with the output of all 1's sensor 25 connected to the other input of both those gates.

In operation of the deviation value generator circuit shown in FIG. 1, when counter 15 has reached the full state its all 1's condition is detected by sensor 25. Upon application of the next pulse to counting input terminal 10, the sensor generates a pulse which is effective to change the state of flip-flop 22 from $\bar{Q}$ to Q. The assumption of its Q state by the flip-flop triggers one-shot multivibrator 14 to generate an extra pulse, i.e., one that is in addition to those applied to counting input terminal 10. This extra pulse, which is gated to counter 15 via gate 12, serves the purpose of changing the count of the counter from full to empty plus one (all 0's, except in the 2° position), stepping the counter beyond the all 0 state to the correct positive deviation step. The effect of this is to inhibit the all 0 state of the counter which would otherwise produce a zero deviation output just as the all 1 counter condition does. That is to say, when the counter is empty or full the conclusion must be that there is no deviation of the instantaneous number of incoming counting pulses from the pre-programmed count (preselected number of events). Beyond that count, the preprogrammed count, a positive deviation occurs; below the programmed count a negative deviation occurs.

Suppose, for example, the programmed count of counter 15 is 20. This means that initially (upon startup or reset of the circuit) the total number of count pulses received at terminal 10 deviates by 20 from the programmed count, in a negative sense. After 10 pulses have occurred, the actual count deviates by only 10 from the programmed count, still negatively. When 20 pulses have been inputted to the counter it is in the "full" condition, or all 1's condition, a condition of zero deviation of the total number of received pulses from the programmed count. The very next incoming counting pulse would change the count of the counter from all 1's to all 0's which, like the all 1's count, would register as zero deviation because of the operation to which the multiplexer 17 is constrained, as will be explained presently. This all 0's state is effectively inhibited, however, by the production of an extra pulse, through the operation of all 1's sensor 25, flip-flop 22, and one-shot multivibrator 14, as explained above. Thus, the next counting pulse represents a deviation of one from the programmed count in a positive sense, and so forth. It is this need for displaying positive as well as negative deviations from a programmed count that leads to the use of normal and inverted binary counter outputs as inputs, selectively, to multiplexer 17.

Initially, i.e., at reset or startup, flip-flop 22 is in the $\bar{Q}$ state. In this condition the normal binary outputs of the counter are inhibited while the inverted outputs are passed by the multiplexer 17. In addition, the $\overline{Q}$ condition of flip-flop 22 causes the generation of a negative sign designation as an output of NAND gate 27, indicating that the deviation is a negative displacement from the desired (programmed) count.

When the actual count is identical to the desired count the counter is full and the deviation is zero. Upon the next pulse applied to counting input terminal 10, sensor 25 sets flip-flop 22 to the Q state, triggering one-shot 14 which generates a single pulse (and that only when flip-flop 22 assumes the Q state), the one-shot thereafter returning to its stable state. The application of the output of sensor 25 to both NAND gates 27 and 28 all serves to inhibit any sign indication at zero deviation. The "extra" pulse generated by the one-shot is inputted to the counter 15 via gate 12 and effectively inhibits any further zero deviation indication as would otherwise occur for the next counting pulse, as previously discussed.

Assumption of its Q state by flip-flop 22 also activates gate 28 to provide a positive deviation sign for subsequent counting pulses, and changes the selection of inputs as outputs by multiplexer 17 by inhibiting the inverted binary counter outputs while passing the normal counter outputs. Thereby each succeeding incoming counting pulse generates a positive deviation in increments and count corresponding identically to the count of counter 15. The outputs of multiplexer 17 may be supplied to a suitable display or otherwise utilized. The following table shows the binary code relationships of the counter output and multiplexer output relative to deviations of −20 to +20 from programmed count.

I claim:
1. Apparatus for continuously indicating the deviation of actual counted events from a predetermined count of events, comprising programmable counter means programmed to count received incoming pulses in accordance with said predetermined count, for generating a pattern of digitally encoded outputs in response to each received said incoming pulse and being representative of an actual count of said received incoming pulses, means for supplying pulses representative of occurrence of selected events as the input to said programmable counter means, and means responsive to each said pattern of digitally encoded outputs of said programmable counter means, for converting said pattern of digitally encoded outputs to digital representations of the deviation of each actual count from the predetermined count, said digital representations including the sense of each deviation relative to the predetermined count, and wherein said counter means exhibits the characteristic of having two successive incoming pulse actuated non-deviation count conditions corresponding with a full count condition and a successive empty count condition, inhibiting means responsive to said full count condition for effectively inhibiting said counter from being successively actuated to a full count condition and then to said empty count condition in response to two successively received incoming pulses.

| Deviation from Programmed Total Count | | Ripple Counter Outputs | | | | | Multiplexer Outputs | | | | |
|---|---|---|---|---|---|---|---|---|---|---|---|
| | | $2^4$ | $2^3$ | $2^2$ | $2^1$ | $2^0$ | $2^4$ | $2^3$ | $2^2$ | $2^1$ | $2^0$ |
| −20 | | 0 | 1 | 0 | 1 | 1 | 1 | 0 | 1 | 0 | 0 |
| −19 | | 0 | 1 | 1 | 0 | 0 | 1 | 0 | 0 | 1 | 1 |
| −18 | | 0 | 1 | 1 | 0 | 1 | 1 | 0 | 0 | 1 | 0 |
| −17 | | 0 | 1 | 1 | 1 | 0 | 1 | 0 | 0 | 0 | 1 |
| −16 | | 0 | 1 | 1 | 1 | 1 | 1 | 0 | 0 | 0 | 0 |
| −15 | | 1 | 0 | 0 | 0 | 0 | 0 | 1 | 1 | 1 | 1 |
| −14 | | 1 | 0 | 0 | 0 | 1 | 0 | 1 | 1 | 1 | 0 |
| −13 | | 1 | 0 | 0 | 1 | 0 | 0 | 1 | 1 | 0 | 1 |
| −12 | | 1 | 0 | 0 | 1 | 1 | 0 | 1 | 1 | 0 | 0 |
| −11 | | 1 | 0 | 1 | 0 | 0 | 0 | 1 | 0 | 1 | 1 |
| −10 | | 1 | 0 | 1 | 0 | 1 | 0 | 1 | 0 | 1 | 0 |
| −09 | | 1 | 0 | 1 | 1 | 0 | 0 | 1 | 0 | 0 | 1 |
| −08 | | 1 | 0 | 1 | 1 | 1 | 0 | 1 | 0 | 0 | 0 |
| −07 | | 1 | 1 | 0 | 0 | 0 | 0 | 0 | 1 | 1 | 1 |
| −06 | | 1 | 1 | 0 | 0 | 1 | 0 | 0 | 1 | 1 | 0 |
| −05 | | 1 | 1 | 0 | 1 | 0 | 0 | 0 | 1 | 0 | 1 |
| −04 | | 1 | 1 | 0 | 1 | 1 | 0 | 0 | 1 | 0 | 0 |
| −03 | | 1 | 1 | 1 | 0 | 0 | 0 | 0 | 0 | 1 | 1 |
| −02 | | 1 | 1 | 1 | 0 | 1 | 0 | 0 | 0 | 1 | 0 |
| −01 | | 1 | 1 | 1 | 1 | 0 | 0 | 0 | 0 | 0 | 1 |
| +00 | | 1 | 1 | 1 | 1 | 1 | 0 | 0 | 0 | 0 | 0 |
| — | Inhibited State | 0 | 0 | 0 | 0 | 0 | — | — | — | — | — |
| +01 | | 0 | 0 | 0 | 0 | 1 | 0 | 0 | 0 | 0 | 1 |
| +02 | | 0 | 0 | 0 | 1 | 0 | 0 | 0 | 0 | 1 | 0 |
| +03 | | 0 | 0 | 0 | 1 | 1 | 0 | 0 | 0 | 1 | 1 |
| +04 | | 0 | 0 | 1 | 0 | 0 | 0 | 0 | 1 | 0 | 0 |
| +05 | | 0 | 0 | 1 | 0 | 1 | 0 | 0 | 1 | 0 | 1 |
| +06 | | 0 | 0 | 1 | 1 | 0 | 0 | 0 | 1 | 1 | 0 |
| +07 | | 0 | 0 | 1 | 1 | 1 | 0 | 0 | 1 | 1 | 1 |
| +08 | | 0 | 1 | 0 | 0 | 0 | 0 | 1 | 0 | 0 | 0 |
| +09 | | 0 | 1 | 0 | 0 | 1 | 0 | 1 | 0 | 0 | 1 |
| +10 | | 0 | 1 | 0 | 1 | 0 | 0 | 1 | 0 | 1 | 0 |
| +11 | | 0 | 1 | 0 | 1 | 1 | 0 | 1 | 0 | 1 | 1 |
| +12 | | 0 | 1 | 1 | 0 | 0 | 0 | 1 | 1 | 0 | 0 |
| −13 | | 0 | 1 | 1 | 0 | 1 | 0 | 1 | 1 | 0 | 1 |
| +14 | | 0 | 1 | 1 | 1 | 0 | 0 | 1 | 1 | 1 | 0 |
| +15 | | 0 | 1 | 1 | 1 | 1 | 0 | 1 | 1 | 1 | 1 |
| +16 | | 1 | 0 | 0 | 0 | 0 | 1 | 0 | 0 | 0 | 0 |
| +17 | | 1 | 0 | 0 | 0 | 1 | 1 | 0 | 0 | 0 | 1 |
| +18 | | 1 | 0 | 0 | 1 | 0 | 1 | 0 | 0 | 1 | 0 |
| +19 | | 1 | 0 | 0 | 1 | 1 | 1 | 0 | 0 | 1 | 1 |
| +20 | | 1 | 0 | 1 | 0 | 0 | 1 | 0 | 1 | 0 | 0 |

2. Apparatus according to claim 1, wherein said converting means includes
 means for detecting the full count state occurring at the predetermined count of said counter means as representative of zero deviation of the actual count from the predetermined count, and
 means responsive to the detection of said full count state for changing the sense of each succeeding digital representation to designate an actual count exceeding the predetermined count.

3. Apparatus according to claim 2, wherein said converting means further includes
 means for decrementing the digital representations of deviation for each increasing count of said counter means prior to the detection of said full count state, and responsive to said detection of said full count state to increment the digital representations of deviation for each increasing count of said counter means thereafter.

4. Apparatus according to claim 2, wherein said converting means further includes
 means responsive to the detection of said full count state of said counter means for inhibiting any further representation of zero deviation during the counting of said incoming pulses.

5. Apparatus according to claim 1, wherein said converting means includes
 means for incrementally increasing the digital representations for each said received incoming pulse when the deviation of the actual count is increasing relative to the predetermined count and for incrementally decreasing the digital representations for each said received incoming pulse when the deviation of the actual count is decreasing relative to the predetermined count.

6. Apparatus according to claim 5, wherein said converting means further includes
 means for detecting the condition of zero deviation, from the state of said counter means, and for dictating the change in direction of the increments of said means for increasing and decreasing.

7. Apparatus as set forth in claim 1, wherein said inhibiting means includes means for supplying a simulated incoming pulse to said counter means at a point in time between said two successively received incoming pulses so that said counter means is actuated to a count condition of empty plus one in response to receiving the second of said two successively received pulses.

* * * * *